United States Patent [19]

Shajenko

[11] 4,188,096
[45] Feb. 12, 1980

[54] ACOUSTO-OPTICAL TRANSDUCER

[75] Inventor: Peter Shajenko, Storrs, Conn.

[73] Assignee: The United States of America as represented by the Secretary of the Navy, Washington, D.C.

[21] Appl. No.: 673,180

[22] Filed: Apr. 2, 1976

[51] Int. Cl.$^2$ ............................................. G02F 1/11
[52] U.S. Cl. ................................................. 350/358
[58] Field of Search ................ 356/112; 350/161 W, 350/358; 331/94.5 M

[56] References Cited

U.S. PATENT DOCUMENTS 3,470,329  9/1969  Young ................................. 356/112

OTHER PUBLICATIONS

Ingard et al., Flexible-Membrane Fabry-Perot Interferometer. Amer. J. Phys., vol. 35, No. 3 (Mar. 1967), p. 285.

Primary Examiner—William L. Sikes
Attorney, Agent, or Firm—Richard S. Sciascia; Arthur A. McGill; Prithvi C. Lall

[57] ABSTRACT

An acousto-optical transducer which includes a pair of mirrors of high reflectivity arranged in parallel to form an etalon. A laser beam enters the etalon at a small angle of incidence through a window and after suffering many reflections at the etalon mirrors exits at the second window. The reflected beam carries the information imposed by an acoustic pressure wave which affects the position of the etalon mirrors. The reflected laser beam of changed frequency due to the doppler shift caused by the motion of the etalon mirrors relative to the source of the incident laser beam is then used to beat with a light of a fixed frequency by using the heterodyne technique. Alternatively, an additional mirror is used which is generally perpendicular to the etalon mirrors and facilitates the reflections at the etalon mirrors for the ultimately reflected beam.

5 Claims, 4 Drawing Figures

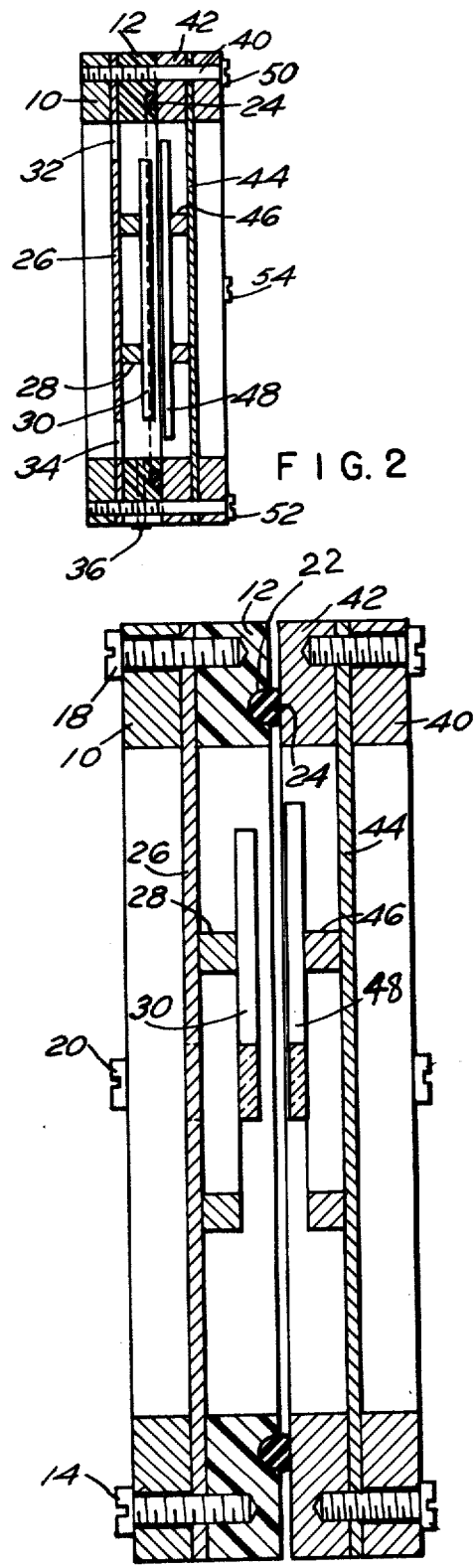
FIG. 2
FIG. 3
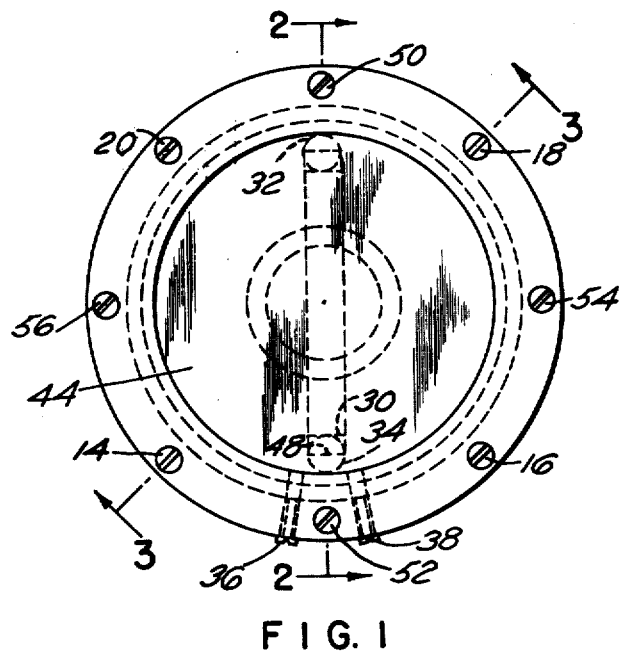
FIG. 1
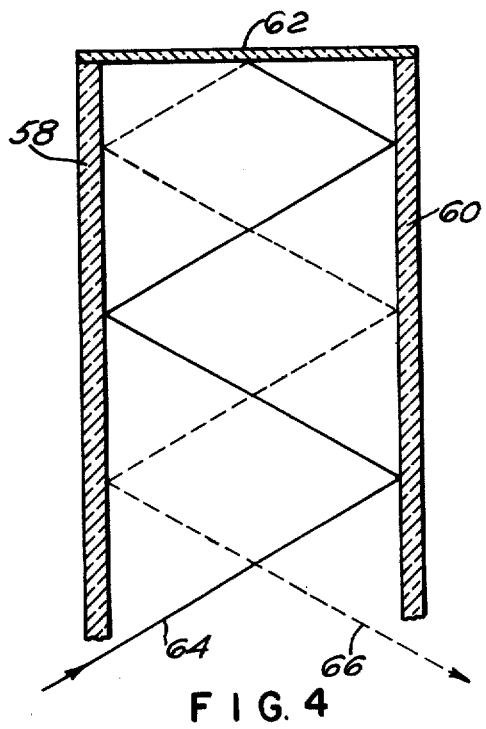
FIG. 4

ACOUSTO-OPTICAL TRANSDUCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to acoustic transducers and more particularly to an acousto-optical transducer which uses a laser beam incident upon a pair of parallel mirrors which move under the influence of acoustic pressure waves in a medium such as water.

Conventional sound sensing devices comprise piezoelectric transducers. They include piezo-electric crystals which when subjected to variations in pressure resulting from an acoustic pressure wave, generated electrical signals which can be processed using electronic devices. However, their use in thin line arrays impose many difficulties such as the use of electronic devices associated therewith. The electronic devices used for each of the transducers forming a line array are distributed along the line and require power for their operation. Furthermore, there is a limit in reduction in size and weight of thin line arrays using piezo-electric transducers. Consequently, the operational reliability of the line arrays depends upon electronic devices used in addition to other factors involved. It is thus desirable to use transducers which do not require any associated electronics and thus eliminating any electric power needed to drive such electronic devices. This improves the operation reliability of thin arrays. Furthermore, it is desirable to have thinner and lighter thin line arrays which are possible to construct and which have improved self-noise performance and are less expensive.

SUMMARY OF THE INVENTION

The acousto-optical transducer of the present invention is an optical system used for measuring changes in pressures due to an acoustic wave traveling in a body of water. The transducer comprises a pair of mirrors of high reflectivity arranged in parallel to form an etalon. The etalon so formed is housed in a water tight housing and a laser beam is allowed to enter the housing at a small angle of incidence into the etalon. After suffering many reflections at the etalon mirrors, the laser beam is made to come out of the housing. The reflected beam experiences a frequency shift due to the doppler shift as the acoustic pressure waves imparts motion to the etalon mirrors relative to the source of the incident laser beam. The reflected laser beam is then used to beat with a light of a fixed frequency by using an heterodyne technique. The data obtained are originally in an optical form and the application of various data processing techniques, such as optical, digital or analog techniques is possible. Alternatively, another mirror perpendicular to the pair of parallel mirrors forming the etalon is used to allow the incident laser beam experience a series of reflections at the etalon mirrors before getting out of the housing. The incoming and reflected laser beams can be transmitted by means of optical fibers which are mechanically very strong. The use of optical fibers thus makes it possible to construct lighter thin line arrays without using strengthening members and thus improving the self-noise performance of such arrays.

An object of subject invention is to provide an acousto-optical transducer which does not require any electronic devices for the processing of the signals thereof.

Another object of subject invention is to provide a transducer which has smaller size and less weight than a piezo-electric transducer.

Still another object of this invention is to provide an acousto-optical transducer which can be arranged in a thin line array of greater sensitivity and directionality.

Still another object of this invention is to have an acousto-optical transducer which is cheaper than the conventional piezo-electric transducers.

Still another object of this invention is to provide an acousto-optical transducer which is mechanically strong and has sensitivity and dynamic range comparable to the piezo-electric transducers of today.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a plan view of an acousto-optical transducer built according to the teachings of subject invention;

FIG. 2 is vertical cross-sectional view of the transducer of FIG. 1 taken along line 2—2 of FIG. 1;

FIG. 3 is an enlarged vertical cross-section of the transducer taken along line 3—3 of FIG. 1; and FIG. 4 is a schematic representation of another embodiment of the acousto-optical transducer according to the teachings of subject invention.

DESCRIPTION OF PREFERRED EMBODIMENTS

Referring to the drawings wherein like reference characters designate like parts throughout the several views, and more particularly to FIG. 1 thereof, a plan view of an acousto-optical transducer built according to the teachings of subject invention is shown. As shown in FIGS. 2 and 3, ring 10, preferably made of noncorrosive material such as stainless steel, is attached to ring 12 of generally the same size by means of screws 14, 16, 18 and 20. As shown in FIGS. 2 and 3, ring 12 has a groove 22 on the opposite face thereof for accommodating a rubber o-ring 24. A light and flexible membrane 26 is sandwiched between rings 10 and 12. A spacer 28 is attached to membrane 26 at the center thereof. A reflecting mirror 30 is symmetrically attached to spacer 28. Two holes are drilled in membrane 26, one each adjacent the two ends of mirror 30 and windows 32 and 34 are formed by putting a mylar window on each of the two holes. Two micro holes 36 and 38 are drilled in ring 10 for filling the transducer housing with a transparent liquid such as pure water. Holes 36 and 38 are also used for pressure equallization. Another pair of rings 40 and 42 sandwiching membrane 44 therebetween forms the other half of the transducer. Attached to membrane 44 is a cylindrical spacer 46 at the center of membrane 44. Mirror 48 is attached to spacer 46 so as to place it symmetrically with respect to spacer 46. A set of four screws, similar to screws 14, 16, 18 and 20, is used to sandwich diaphragm 44 between rings 40 and 42. Ring 42 has a groove similar to groove 22 to accommodate o-ring 24. A magnified cross-sectional view of the transducer built according to the teachings of subject invention is shown in FIG. 3. This view represents a cross-section taken along line 3—3 of FIG. 1. Screws 50, 52, 54 and 56 are used to put the two halves of the transducer together and the pressure on o-ring 24 is adjusted by means of screws 50, 52, 54 and 56 so as to make mirrors 30 and 48 parallel to each other and to make the two halves of the housing air tight and water tight. After assembling the two halves of the transducer and adjusting the pressure on the o-ring 24 so as to make it water and air tight and mirrors 30 and 48 parallel, the inside of the transducer is filled with a transparent liquid such as water. Furthermore, it should be noted that rings 10, 40, 42; membranes 26 and 44 and spacers 28 and 46 are made of a non-rusting material such as stainless steel. Furthermore, the membranes 26 and 48 are light and flexible and are preferably made of stainless steel. Ring 12 is made of acrylic. However, it can also be made of noncorrosive material such as stainless steel. Another embodiment of the transducer is schematically shown in FIG. 4 where two parallel mirrors 58 and 60 form an etalon and mirror 62 generally perpendicular to the parallel mirrors 58 and 60, is used for reflecting the incident or incoming laser beam 64 shown by solid line and reflects back the outgoing or reflected laser beam 66.

In operation, the transducer after its assembly and after filling its housing with a transparent liquid such as pure water, is placed in the area experiencing pressure variations due to acoustic pressure waves. The pressure variations make membranes 26 and 44 move proportionally. The motion is transferred to mirrors 30 and 48 which affects the optical laser beam entering the housing through one of the optical windows 32 and 34. After experiencing a series of reflections at mirrors 30 and 48, the laser beam comes out of the housing through the second of windows 30 and 48. The information carried by the reflected laser beam is processed by one of the standard data processing techniques such as optical, digital or analog techniques.

Thus an acousto-optical transducer of the present invention comprises a pair of high reflectivity mirrors placed in a housing formed by a set of four matching rings. The housing is filled with a transparent liquid and is placed in an area experiencing pressure variations due to acoustic pressure waves. Each of the two mirrors is attached to a light membrane sandwiched between a pair of matching rings, which is subjected to the pressure variations. The pressure variations due to the acoustic pressure waves proportionally move the membranes which in turn affect the positions of the mirrors inside the transducer housing. A laser beam incident upon the etalon formed by the pair of parallel mirrors is reflected by the mirrors. The reflected laser beam experiences a frequency shift due to the motion of the mirrors and is used to modulate light of a fixed frequency. The data obtained is processed by using one of the standard processing techniques.

Obviously many modifications and variations of the present invention are possible in the light of above teachings. As an example, the type of the transducer housing can be varied as long as the pressure variations are transferred freely to the parallel mirrors forming the etalon. Furthermore, the liquid used inside the transducer housing can be other than pure water as long as it is transparent. Besides, the rings, the membranes and the other components can be made of any noncorrosive material. It is therefore understood that within the scope of the appended claims the invention may be practiced otherwise than as specifically described.

I claim:

1. An acousto-optical transducer for detecting acoustic pressure wave which comprises:
    a generally cylindrical housing having two generally parallel faces, said housing being air tight and water tight;
    a pair of mirrors including a first mirror and a second mirror, said first mirror and said second mirror being arranged to be parallel to each other in said housing and being generally parallel to the faces of said housing;
    means for free motion of said pair of mirrors under the influence of the acoustic pressure waves;
    means for filling said housing with a transparent fluid;
    means for allowing an incident light beam of a first frequency to fall on said first mirror in said housing and for allowing the reflected light of a second frequency after multiple reflections thereof to come out of said housing; and
    means for comparing said reflected light beam of the second frequency with a light beam of a fixed frequency.

2. The acousto-optical transducer of claim 1 wherein said housing includes a first pair and a second pair of matching rings, a first membrane being sandwiched between the rings of said first pair of rings and a second membrane being sandwiched between the rings of said second pair of rings, said first membrane and said second membrane forming said generally parallel faces of said housing.

3. The acousto-optical transducer of claim 2 wherein said means for free motion of said pair of mirrors under the influence of the acoustic pressure waves includes a first spacer being symmetrically attached to said first membrane at the center thereof and to said first mirror at the center thereof, and a second spacer being symmetrically attached to said second membrane at the center thereof and to said second mirror at the center thereof.

4. The acousto-optical transducer of claim 2 wherein means for allowing incident light to fall on said first mirror and for allowing reflected light to get out of said housing includes two openings in said first membrane adjacent the ends of said first mirror.

5. The acousto-optical transducer of claim 2 wherein said means for filling said housing with a transparent fluid comprises two openings in said first pair of rings, said openings being adapted to open and close as needed.

* * * * *